M. L. CLOPTON.
RING GAUGE.
APPLICATION FILED MAY 6, 1921.

1,424,082.

Patented July 25, 1922.

WITNESS:

M. L. Clopton
INVENTOR

BY Victor J. Evans
ATTORNEY

UNITED STATES PATENT OFFICE.

MORTIMER L. CLOPTON, OF WICHITA FALLS, TEXAS.

RING GAUGE.

1,424,082. Specification of Letters Patent. Patented July 25, 1922.

Application filed May 6, 1921. Serial No. 467,382.

*To all whom it may concern:*

Be it known that I, MORTIMER L. CLOPTON, a citizen of the United States, residing at Wichita Falls, in the county of Wichita and State of Texas, have invented new and useful Improvements in Ring Gauges, of which the following is a specification.

The measuring devices employed by jewelers for ascertaining the size of rings are in the nature of cone-shaped devices which are either made solid or of hollow metal. In each instance, the gauge is non-yieldable and as a consequence an accurate size of a set ring cannot be determined. This is because there is naturally a flattened portion at the set of the ring, and should the ring gauge be forced through the ring to accurately gauge the same, the prongs of the set will be spread away from the set. It is therefore to be considered the object of this invention to produce a ring gauge for jewelers' use which shall be of a flexible nature which also embodies elasticity so that a ring forced over the gauge will cause the said gauge to yield to the pressure exerted thereon by the ring and conform itself to the shape of the ring, so that the jeweler can accurately determine the proper size of the ring without injury to the ring, and the nature of the gauge permitting the same to return to its initial position when the ring is removed therefrom.

It is a further object to produce a gauge for jewelers' use in measuring rings that may be constructed from a single sheet of yieldable elastic material, whereby the same may be cheaply manufactured and marketed.

Other objects and advantages will present themselves as the nature of the invention is better understood, reference being had to the drawings in which there is illustrated a satisfactory embodiment of the improvement reduced to practice.

In the drawing:—

Figure 1:
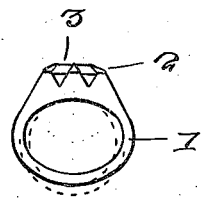
Figure 1 is a side elevation of a ring having a heavy mounting, the dotted lines illustrating the manner in which the same must be bent by the ordinary ring gauge in ascertaining the proper size of the ring.

A ring, indicated by the numeral 1, is illustrated in Figure 1 of the drawings. The ring is provided with prongs 2 for engaging the gem 3. The mounting is comparatively heavy, and by reference to the drawing it will be seen that the ring is not a true circle. To ascertain the size of the ring with the ordinary non-yieldable measuring ring gauges, it would be necessary to force the ring over the gauge and in so doing cause the ring to be bent to the shape illustrated by the dotted lines. The result is that the prongs 2 will be spread away from the gem 3, and as a consequence the gem is not securely mounted.

Figure 2:
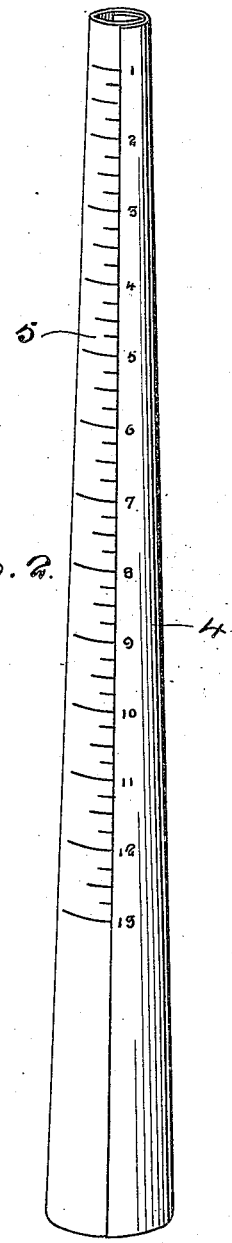
Figure 2 is a perspective view of the improvement.
Figure 3:
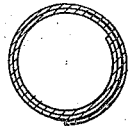
Figure 3 is a transverse sectional view therethrough.

As disclosed in Figures 2 and 3 of the drawing, my improved ring gauge is constructed from a single sheet of flexible material which embodies a natural elasticity. The sheet is wrapped upon itself to provide a hollow cone-shaped body 4. The body, from the reduced end thereof is provided with a scale 5 indicating the different sizes of rings to be measured. Preferably the ring gauge is constructed of celluloid but other suitable material can be employed. It will be apparent that with a ring gauge constructed in accordance with my invention when a ring is drawn over the gauge and is brought in frictional contact with the gauge, such contact will cause the gauge to yield and to conform itself to the inner surface of the ring so that the proper size of the ring can be readily ascertained without injury to the same. When the ring is withdrawn from the gauge the said gauge, because of its inherent properties will assume its initial condition, that is, will return to its cross sectionally rounded shape.

Having described the invention, I claim:—

A ring gauge comprising a hollow tapered tube of a material susceptible to distortion to change the shape thereof when a ring has been inserted thereover and forcibly brought thereagainst and adapted to conform itself to the shape of the ring without changing the circumference of the tube.

In testimony whereof I affix my signature.

MORTIMER L. CLOPTON.